Oct. 29, 1935.  E. CONTI  2,019,117

APPARATUS FOR MANUFACTURING CONTAINERS

Filed March 17, 1934   7 Sheets-Sheet 1

INVENTOR
*Eugene Conti.*
BY
*Emery, Booth, Varney & Whittemore*
ATTORNEYS

Oct. 29, 1935.  E. CONTI  2,019,117

APPARATUS FOR MANUFACTURING CONTAINERS

Filed March 17, 1934   7 Sheets-Sheet 2

INVENTOR
EUGENE CONTI.
BY
Emery, Booth, Varney & Whittemore
ATTORNEYS

Oct. 29, 1935.  E. CONTI  2,019,117
APPARATUS FOR MANUFACTURING CONTAINERS
Filed March 17, 1934  7 Sheets-Sheet 3

INVENTOR
EUGENE CONTI.
BY
Emery, Booth, Varney & Whittemore
ATTORNEYS

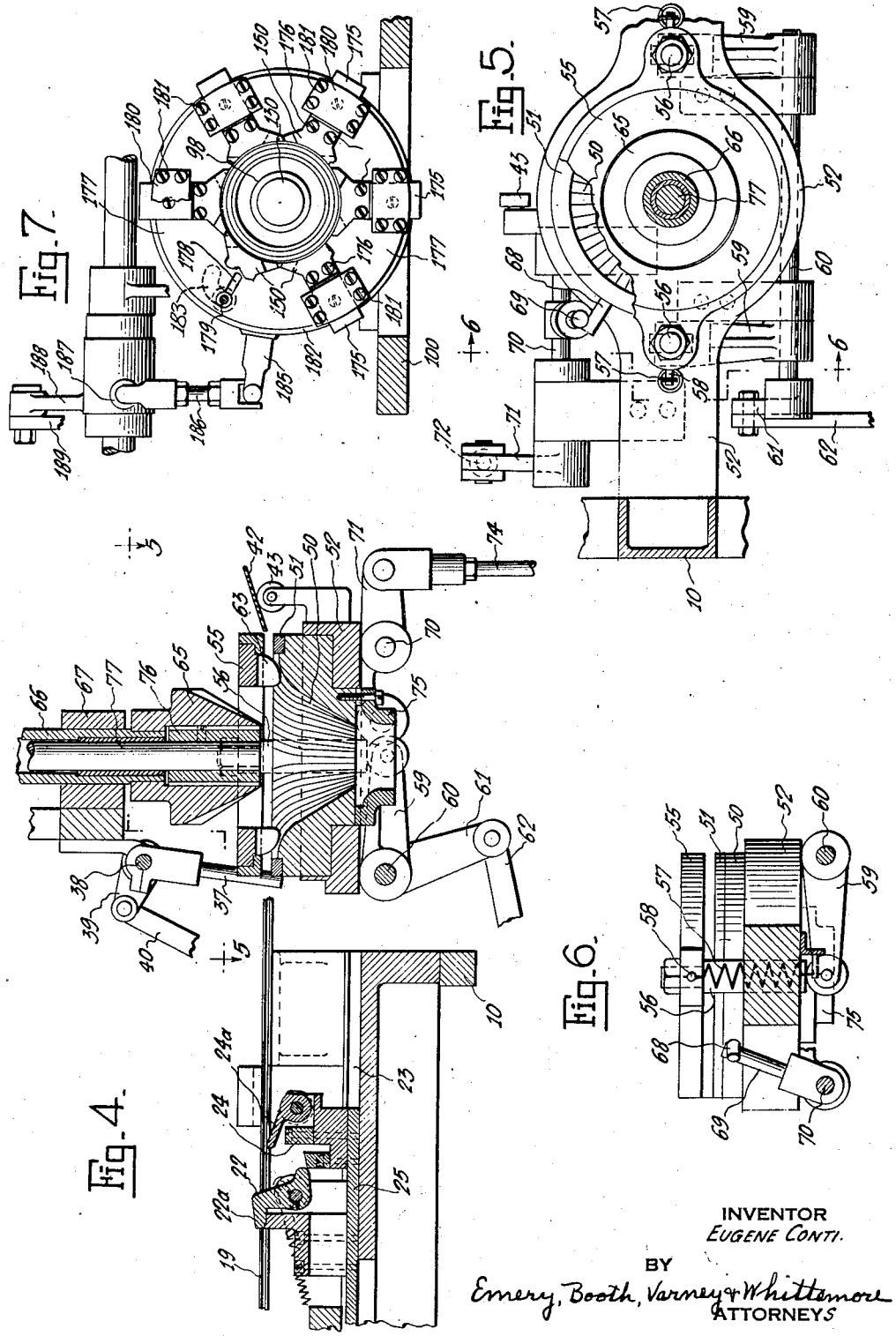

Oct. 29, 1935.  E. CONTI  2,019,117
APPARATUS FOR MANUFACTURING CONTAINERS
Filed March 17, 1934   7 Sheets-Sheet 5

INVENTOR
EUGENE CONTI.
BY
Emery, Booth, Varney & Whittemore
ATTORNEYS

Oct. 29, 1935.   E. CONTI   2,019,117
APPARATUS FOR MANUFACTURING CONTAINERS
Filed March 17, 1934   7 Sheets-Sheet 6
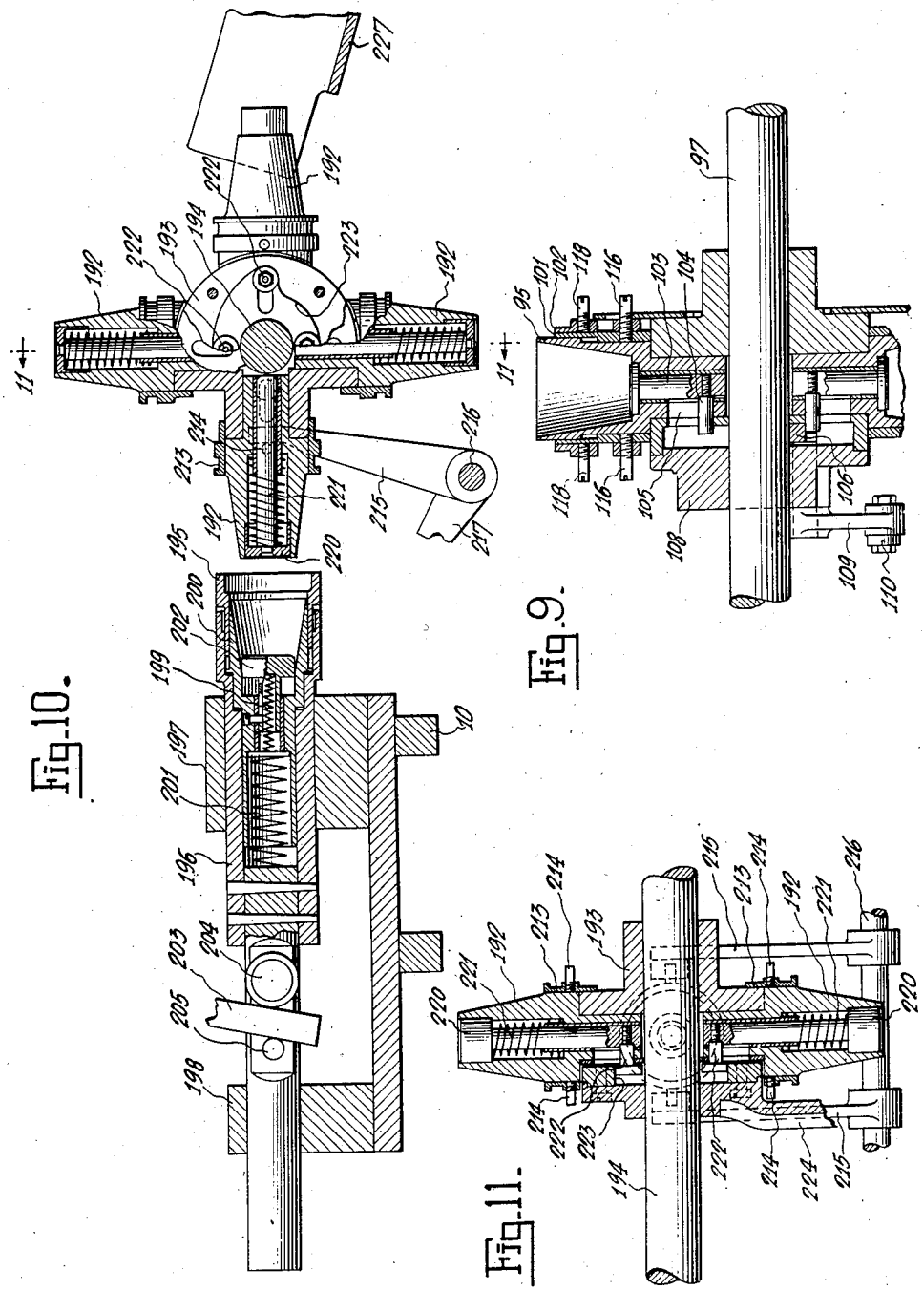
INVENTOR
EUGENE CONTI.
BY
Emery, Booth, Varney & Whittemore
ATTORNEYS

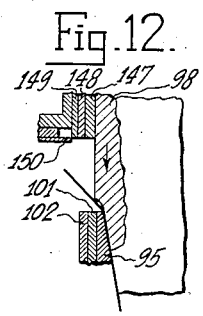 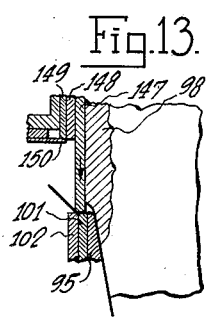 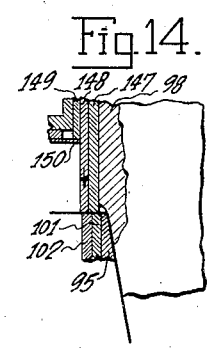 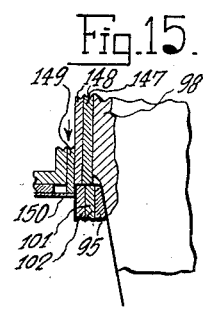 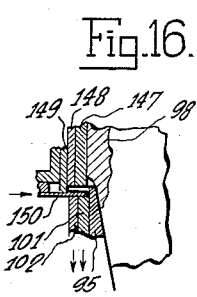 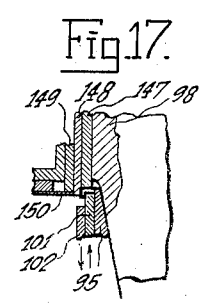 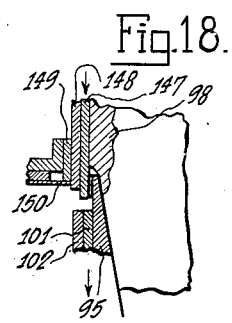 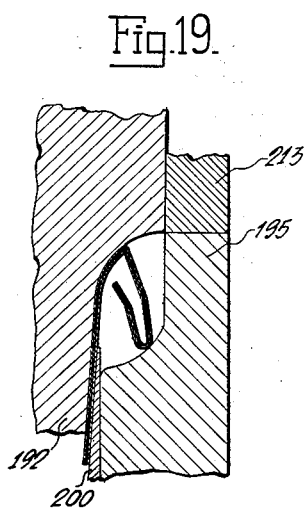 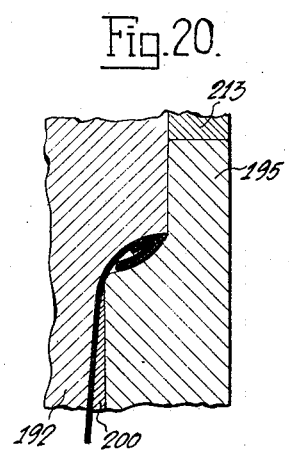

Patented Oct. 29, 1935

2,019,117

UNITED STATES PATENT OFFICE 2,019,117

APPARATUS FOR MANUFACTURING CONTAINERS

Eugene Conti, Mount Vernon, N. Y., assignor to Herz Cup Company, Incorporated, New York, N. Y., a corporation of New York Application March 17, 1934, Serial No. 716,168

25 Claims. (Cl. 93—60)

This invention relates to apparatus for making containers of paper or other suitable material and has for an object the provision of improved apparatus of this character.

The invention will be described in connection with an exemplary embodiment thereof intended for making plaited paper drinking cups, the same being illustrated in the accompanying drawings, wherein:

Fig. 4 is an enlarged vertical section of certain mechanism for feeding and plaiting paper blanks, the view being taken slightly behind the line on which Fig. 3 is taken;

Fig. 5 is a horizontal section taken on the line 5—5 of Fig. 4;

Fig. 6 is a vertical section taken on the line 6—6 of Fig. 5;

Fig. 7 is a vertical section taken on the line 7—7 of Fig. 8, showing certain iris diaphragm mechanism employed in folding the rim;

Fig. 8 is an enlarged vertical section of certain mechanism employed for preliminarily forming rims on the containers, the view being taken slightly behind the line on which Fig. 3 is taken;

Fig. 9 is a vertical section taken on the line 9—9 of Fig. 8;

Fig. 10 is an enlarged vertical section of certain mechanism employed for finishing the rims on the containers, the view being taken slightly behind the line on which Fig. 3 is taken;

Fig. 11 is a vertical section taken on the line 11—11 of Fig. 9;

Figs. 12 to 18 are diagrammatic sections through one side of the mechanism for preliminarily forming a rim on the containers, a container being shown in the mechanism to illustrate its action;

Figs. 19 and 20 are diagrammatic sections through one side of the mechanism for finally forming the rims on the containers, a container being shown in the mechanism to illustrate its action.

Figure 1:
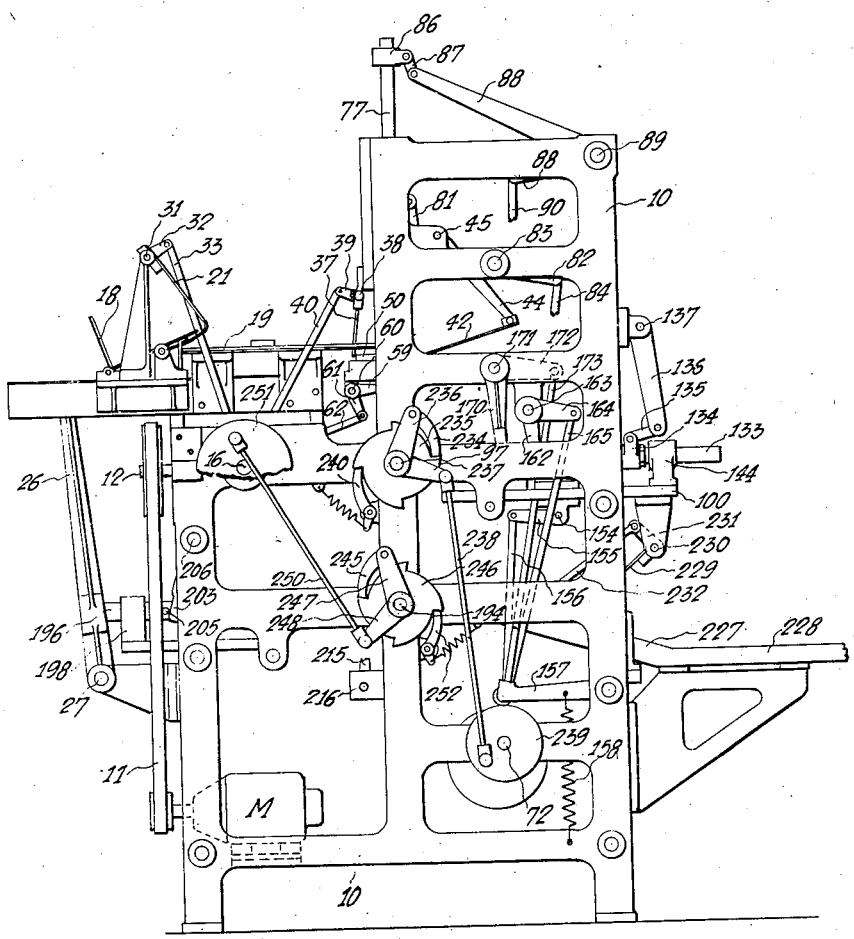
Fig. 1 is a left side assembly elevation of a machine embodying the invention.
Figure 1A:
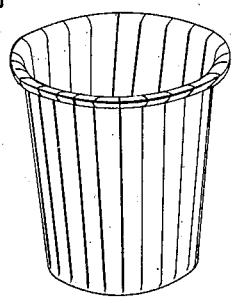
Fig. 1a is a side view of a container made by the machine.

The mechanism is supported upon a main frame 10 and is driven by a motor M through a belt 11 and a shaft 12. The shaft 12 is operatively connected by suitable gearing with a transverse drive shaft 16. Through the shaft 16 all of the mechanisms of the machine are driven.

The present invention avails of a plurality of rotatable carriers on which the container is formed as it moves intermittently from station to station. After the operations upon the container while it is positioned on one carrier have been completed the container is brought into registry with a container-supporting element on the next carrier and is transferred by a simple and direct movement to the next carrier where further operations are performed. Preferably the parts are so arranged as to utilize the action of gravity to assist in the transferring operation. As to general organization the present application is a continuation in part of my co-pending application Serial Number 618,848, filed June 23, 1932.

The container blanks may either be pre-cut or be cut in the forming machine. For present purposes it is preferred to cut them previous to their introduction into this machine and a stack 17 of such blanks is shown supported at the left portion of the machine (Fig. 3) upon an inclined rack 18 and upon the end of a blank guide 19. A swinging suction tube 20 pulls the front edge of the lowermost blank down as a finger 21 swings under the stack above this bottom blank and a first feed device 22 moves over and grips the blank. The feed device 22 moves along a guideway 23 and carries the blank to a second position on the blank guide where the jaws of the device 22 are opened to release the blank. The upper jaw 22a (Fig. 4) after release is swung down out of the path of the blank and the feed device moves back beneath the blank just fed and with the jaws open ready to engage another blank.

Figure 2:
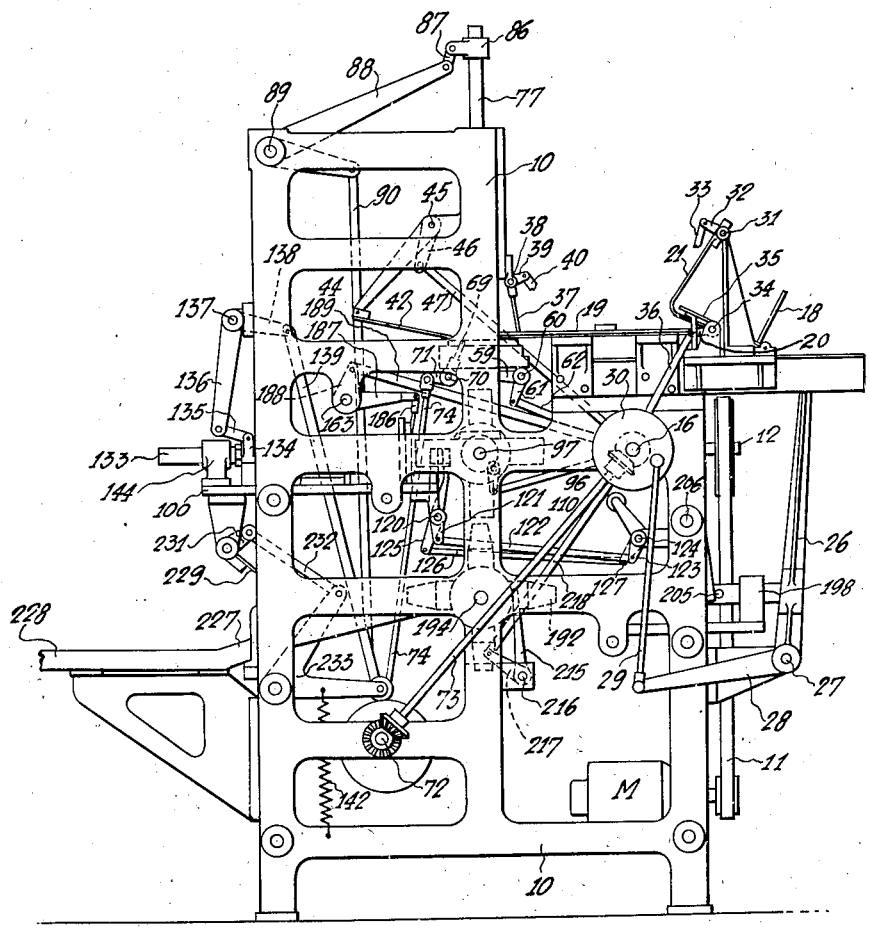
Fig. 2 is a right side elevation of the machine shown in Fig. 1.

A second feed device 24 moves the blank another step but pushes it instead of pulling it as does the first feed device. It also operates along the guideway 23 and has a swinging finger 24a which moves down clear of the blank just fed by the preceding feed device 22 when it returns. The feed devices may be separately operated if desired but may, as shown, be carried by a single slide 25 which is operated by a swinging arm 26 fast on a rock shaft 27. The shaft 27 is operated (Fig. 2) through an arm 28 and a connecting rod 29 by a crank disc 30 on the drive shaft 16. The swinging blank-stack-holding finger 21 (Fig. 1) is secured to a shaft 31 which is operated through an arm 32 and a cam rod 33 by the drive shaft 16. The suction tube 20 (Fig. 2) is secured to a shaft 34 which is operated through an arm 35 and a cam rod 36 by the drive shaft 16. Any suitable means may be employed for producing the suction and timing its action.

A third blank feeding device is constituted by the swinging rods 37 mounted upon the oscillating shaft 38. The shaft is operated by an arm 39 and a cam rod 40 from some convenient shaft, such as the drive shaft 16.

The paper blanks are fed moist and may have a tendency to sag as they move into operating position so there has been provided a tongue 42 (Fig. 3) which receives the blanks on its upper surface and guides them into position. The tongue (Fig. 3) moves over a supporting roller 43. It is pivotally mounted on the end of an arm 44, the arm being carried by a shaft 45 operated by an arm 46 and a cam rod 47 from the shaft 16. The swinging rods 37 and the tongue 42 place the blank over a female plaiting die 50 where pins 48 stop it so that it drops into a ring 51 (see Fig. 4) of the die ready for the plaiting operation. The tongue 42 then withdraws out of the way of the dies. The female die is mounted on a fixed transverse support 52 comprising part of the main frame.

Figure 3:
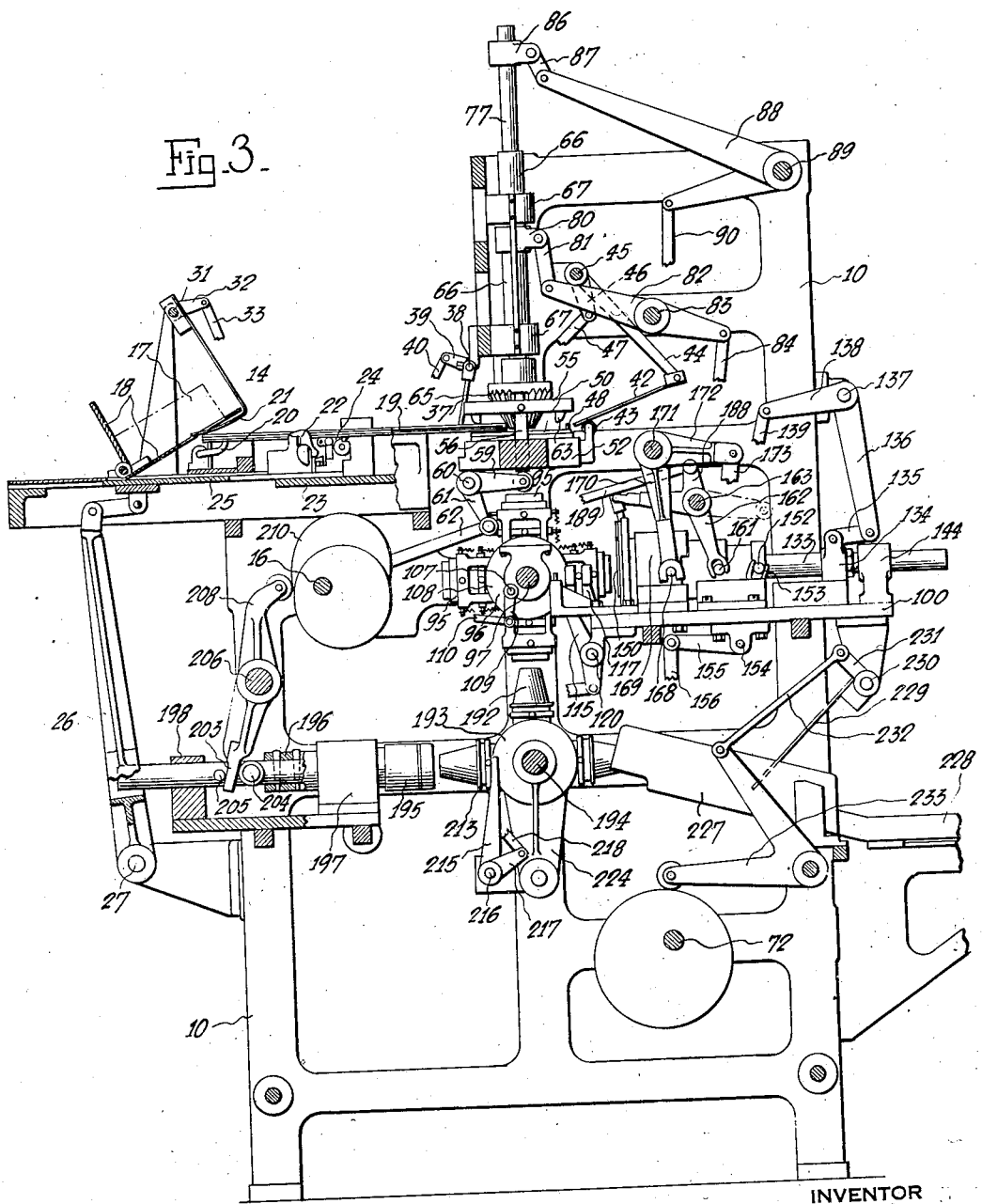
Fig. 3 is a central vertical sectional view of the machine.

Means are provided for apportioning the material circumferentially of the blank so that the plaits may be substantially uniform and so the paper will not buckle at one place or be torn at another place. Such means, as shown in Figs. 3, 4 and 6, comprise a floating ring die 55 mounted on the upper ends of push rods 56. The rods 56 are slidably mounted in suitable guide openings in the support for the female die casting clear of the path of the blanks. The ring die is urged downward by coil springs 57 attached to pins 58 on the ring die at their upper ends and to the support 52 at their lower ends. The ring die is moved upward to permit the insertion of a blank by an arm 59 mounted on a shaft 60. The shaft 60 is operated by an arm 61 and a connecting rod 62 from the drive shaft 16. The floating ring die is provided on its lower surface with a plurality of depending fingers 63 which when the die is lowered enter the corrugations at the top outer edge of the female die and form a corresponding number of corrugations in the outer edge of the blank. The incipient plaits thus started later become the final plaits of the container which is formed. The outer edge of the blank is pulled out from the ring die after the plaiting operations are started.

The plaiting of the blank may be accomplished by any desired type of die mechanism. Solid or rigid die mechanism as distinguished from umbrella die mechanism is preferred on account of its greater sturdiness and dependability. Herein there is shown a rigid male plaiting die 65 slidably mounted upon the lower end of a tubular operating rod 66 which moves in vertical guides 67. The male die is provided with a plurality of ribs and grooves adapted to interfit with the ribs and grooves of the female die 50. The ribs are more inclined on one side than on the other like saw teeth whereby sharp creases may be imparted to the blanks. The taper or conicity of the plaiting dies is so proportioned and they cooperate with the ring die in such a way as to complete the plaiting operation at one position or station. This is an improvement over previous dies of this type which required more than one operation to form acceptable plaits. Moreover, the present mechanism forms more uniform and better shaped plaits than did the previously known dies.

The setting of the plaits may be accomplished by rotating one of the dies with respect to the other after they have converged. As shown in Figs. 4, 5 and 6, the female die 50 is rotated by the following mechanism. A pin 68 is secured in the periphery of the female die and this pin is contacted by an arm 69 fast on a shaft 70. The shaft 70 is operated by an arm 71 and a rod 74 from a cam shaft 72. The shaft 72 (Fig. 2) may be rotated from the shaft 16 by a shaft 73 and suitable bevel gearing. The female die after rotation is returned to position in any suitable manner as by the resiliency of the paper blank and is limited in its rotation by any suitable stops.

Means are provided for transferring the creased blank after it is relieved from the plaiting dies to a second position where it is clear of these dies. This is preferably done (Fig. 4) by pushing the blank through the restricted bottom opening of the female die and through a directing member 75 by a plunger 76 which fits within the male die 65 and which is mounted upon a rod 77 which operates within the tubular rod 66 of the male die. The plunger 76 may be provided with ribs and grooves to mesh with the ribs and grooves in the bottom opening of the female die whereby to preserve the creases of the plaited blank while it is being transferred.

The male die 65 and the plunger 76 may be operated by any suitable means. As shown in Fig. 3, the rod 66 of the male die is provided with a collar 80 to which is attached a link 81. The link is connected to one end of a lever 82 mounted on a shaft 83. To the other end of the lever is attached an operating rod 84 actuated from the cam shaft 72. Similarly the rod 77 of the plunger 76 is provided with a collar 86 to which is attached a link 87. The link 87 is connected to one arm of a bell crank lever 88 mounted on a shaft 89. To the other arm of the bell crank lever is attached an operating rod 90 actuated from the cam shaft 72.

After the plaiting operation the plaited blanks are operated upon to form rims on them. The preferred mechanism for accomplishing this is disclosed and claimed in my co-pending application Serial Number 597,209, filed March 7, 1932. This mechanism with slight modifications together with operating mechanism therefor will be described herein. The general organization and interrelationship of this mechanism in the complete machine assembly will be claimed herein.

It has already been explained how the blanks are fed to the plaiting dies and how they are plaited and ejected through the bottom of the female plaiting die. During the ejecting process the plaited blanks are restricted so as to cause their plaits to lie down in overlapping relationship. These plaited blanks are transferred to one of the cup-shaped dies 95 (Fig. 3) of a first carrier or turret 96 mounted upon a shaft 97. The plunger 76 has a stroke of sufficient length to seat the blank well into the bottoms of the dies 95. The carrier rotates to take the blanks to a second position where a rim-forming operation takes place. Insofar as the broader aspects of the invention are concerned any type of rim-forming mechanism may be employed but specifically there is shown mechanism which folds the rim as illustrated in Figs. 12 to 18.

Figure 8:
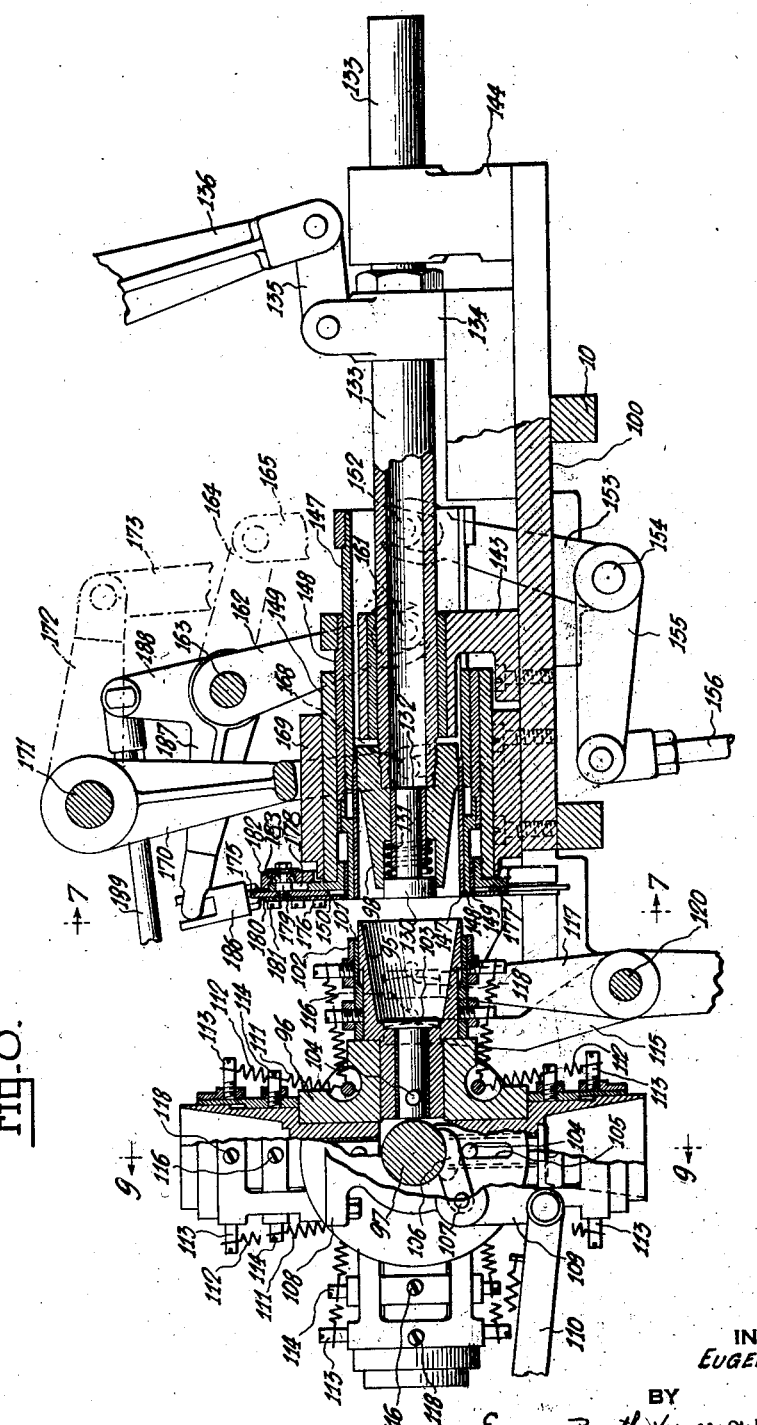

The folding mechanism, as may be seen by referring principally to Figs. 3, 8 and 9, comprises a plurality of cooperating sleeves arranged concentrically around the cup-shaped female die 95 and a cooperating male die 98. The female die and its associated sleeves are mounted on the carrier 96. The male die and its associated sleeves are mounted on a fixed support 100.

The female dies 95 are rigidly secured to the carrier 96 and the first or inner carrier sleeve 101 and the second or outer carrier sleeve 102 are slidably mounted thereon. A bottom-forming and ejecting plunger 103 is slidably mounted within the base of the female die member. The plungers 103 are provided (Fig. 9) with lateral pins 104 which operate within slots 105. The plungers are operated by an arm 106 which acts on the pins 104 when they arrive adjacent thereto. The arm 106 is secured to a shaft 107 which is mounted in the non-rotatable plate 108. The shaft is provided with an operating arm 109 and this is actuated by a rod 110 from the drive shaft 16.

The carrier sleeves 101 and 102 are positively operated in the functional direction and are resiliently operated in the withdrawing direction. As shown in Fig. 8, springs 111, 112 are attached to the carrier and to pins 113, 114 of the inner and outer sleeves 101 and 102 respectively for effecting the resilient withdrawal. The inner sleeve is operated in the functional direction by arms 115 acting upon pins 116 secured to the sleeve. The outer sleeve is operated in the functional direction by arms 117 acting upon pins 118 secured to the sleeve. The arms 115 and 117 (Fig. 2) are mounted to turn about a rock shaft 120. The first 115 is provided with an arm 121 operated through a link 122 by a cam lever 123 mounted on a rock shaft 124 and actuated from the drive shaft 16. The second 117 is provided with an arm 125 operated through a link 126 by a cam lever 127 also mounted to turn about the shaft 124 and actuated from the drive shaft 16.

Within the male die 98 there is disposed a plunger 130 which is approximately of the same diameter as the plunger 103. The two hold the bottom of the container firmly between them and somewhat above the bottom of the female die so that when the annular end of the male die passes down over them it will cause a raised portion to be formed in the bottom of the container. The plunger 130 is urged outwardly with respect to the male die by a spring 131. It is secured to a stem 132 which is mounted within the hollow operating rod 133 of the male die. Suitable means are provided for limiting the movement between the plunger and the male die to prevent the plunger from moving too far inward or too far outward.

Means are provided for operating the male die. As herein shown a collar 134 is secured to the rod 133 of the die. This collar is attached to a link 135 actuated by an arm 136 pivoted at 137. The arm 136 is operated by an arm 138 and a rod 139 from the cam shaft 72. The hollow rod is held in alignment by an inner guide 143 and an outer guide 144.

The male die 98 is surrounded by concentric sleeves 147, 148 and 149. The outer one 149 supports iris diaphragm elements 150 (see also Fig. 7). For certain constructional reasons the sleeves are not made in one part but the several parts act as one so will be referred to under the sleeve designations.

The inner sleeve 147 at its rear end is provided with pins 152 which are engaged by slotted arms 153 mounted on a pivot pin 154. The arms 153 are operated (Fig. 1) by an arm 155 and a rod 156 from the cam shaft 72. A cam arm 157 is pivoted to the frame and to the lower end of the rod 156 to guide the latter, a roller being placed at the joint to operate on the cam. The roller may be urged toward the cam by a spring 158.

The intermediate sleeve 148 at its rear end is provided with pins 161 which are engaged by slotted arms 162 mounted upon a pivot pin 163. The arms 162 are operated (Fig. 1) by an arm 164 and a rod 165 from the cam shaft 72. A cam arm and spring similar to those already described for the rod 156 are provided for guiding and holding the end of the rod 165.

The outer sleeve 149 intermediate its length is provided with pins 168 which pass through axial slots in a fixed guide ring 169 and are engaged by slotted arms 170 mounted on a pivot pin 171. The arms 170 are operated (Fig. 1) by an arm 172 and a rod 173 from the cam shaft 72. A cam arm and spring similar to those already described for the rods 156 and 165 are provided for guiding and holding the end of the rod 173.

The iris diaphragm elements 150 of the outer sleeve 149 are shown in Figs. 7 and 8. They interfit at their inner ends so as to form a complete enclosure whether they are closed or open. They are secured to offset flat stems 175 by screws 176. A flanged plate 177 is secured to the sleeve 149. It is provided with radial slots 178 which receive the shanks of cam pins 179. The pins are secured to the stems 175 of the iris diaphragm elements 150. The stems 175 are slidably retained by straps 180 which are held to the flanged plate 177 by screws 181. A flanged annular plate 182 is mounted behind the plate 177 and is provided with curved cam slots 183 (Fig. 7) which receive rotatable sleeves on the cam pins 179, washers and nuts being used on the pins for retaining the plate. The plate 182 is provided with an arm 185 by which it is rotated.

The diaphragm operating plate 182 may be rotated as follows: A rod 186 is universally connected to the plate arm 185 at one end and to an arm 187 at the other end. The arm 187 is mounted on the pivot pin 163 and is rigid with an upstanding arm 188 which is operated by a rod 189 (Fig. 2) from the drive shaft 16. By this arrangement the iris diaphragm mechanism can be operated in any position of the sleeve 149.

The operation of the sleeve die mechanism for folding the rim is fully explained in my co-pending application Serial Number 597,209, filed March 7, 1932. It may be understood by reference to Figs. 12 to 18. After a female die 95 with a cup blank therein halts in the rim forming position (Fig. 8), the male die 98 is moved into it. First the plunger 130 seats in the center of the bottom of the container blank against the end of the plunger 103. Then the male die 98 moves down around the plunger 130 and forms the depression in the bottom of the container blank. It also moves the blank to its lowest position in the female die and presses the side walls of the blank against the sides of the female die 95. This compresses the plaits and firmly grips the body of the blank leaving the upper edge exposed for further operations. Moreover (Fig. 12) it starts the upper edge of the blank to folding outwardly.

After this (Fig. 13) the inner sleeve 147 of the series on the male die moves down to start folding the upper edge of the blank outward.

Next (Fig. 14) the intermediate sleeve 148 moves down to spread the edge of the blank further.

Next (Fig. 15) the outer sleeve 149 carrying the iris diaphragm mechanism 150 etc. moves down to fold the outer portion downward parallel to the axis of the blank. The members 150 which move slightly ahead of the end of the sleeve 149 cause this downfolding movement.

Next (Fig. 16) the sleeves 101, 102 are backed off slightly and the iris diaphragm elements 150 move radially inward to fold the outer edge of the blank radially inward beneath the inner part which had been clamped.

Next (Fig. 17) the inner sleeve 101 is moved up to clamp the inner portion of the doubled edge and the outer sleeve 102 is backed off further. At the same time the intermediate sleeve 148 is moved down still further to fold the outer portion of this doubled edge downward along the axis. It will be understood that the sleeve 148 passes loosely over the sleeve 101 so that the edge of the blank is not cut; only an incipient fold line is formed.

Finally (Fig. 18) the inner sleeve 101 is retracted and the inner sleeve 147 is moved down past the end of the female die 95 to fold the entire edge downward axially. The sleeve fits loosely over the die so that the blank will not be cut.

All parts are now retracted to the positions shown in Fig. 8. The plunger 130 leaves the container bottom last to insure that the blank is left in the female die.

From the rim folding position the blanks are carried by movement of the carrier 96 to a transfer position where they are removed from the female dies 95 and placed upon a blank-supporting element of another carrier. Preferably the transfer is effected with the assistance of gravity. Referring to Fig. 3, the die 95 in which the blank with the folded rim is positioned is rotated from a horizontal position to a vertical position at the bottom of the carrier. There the plunger 103 (Fig. 8) is actuated by the arm 106 to push the blank out of the female folding die, whereupon it falls in inverted position upon a male finishing die 192 carried by a second carrier or turret 193, and located at this time directly beneath the die 95. The carrier 193 is rotatably mounted on a shaft 194.

The carrier 193 is now rotated one step to carry the finishing die with the container into alignment with a cooperating female finishing die 195 mounted on a plunger 196. The plunger 196 is slidably mounted in fixed guides 197, 198 secured to the main frame.

Within the female rim-shaping die 195 there is slidably disposed a cup-shaped body-holding die 200. The die 200 is normally pressed outward by a spring 201, there being suitable means for limiting the outward movement. Within the bottom of the die 200 there is disposed a bottom-holding plunger 202 pressed outward by a spring 199 and limited in the outward movement by any suitable means. The plunger 202 is provided with a raised portion at the center and an annular depressed portion at the outer edge for preserving the shape of the bottom of the container as formed at the previous station.

The plunger 196 of the female finishing die is positively operated in both directions by a lever arm 203 working between the stud pins 204 and 205 secured to the plunger. The arm 203 is pivoted on a pin 206 and operated by an arm 208 riding a cam 210 secured to the shaft 16.

Sleeves 213 are provided on the male dies 192 for cooperating with the female die 195 for confining the upper edge of the folded container rim after the container body has been gripped and just before the rim shaping or finishing elements of the dies have been operated. The sleeves 213 are each provided with lateral pins 214 for operation by spaced arms 215 mounted on a pivot shaft 216. The shaft 216 is operated (Fig. 3) by an arm 217 and a rod 218 from the shaft 16.

Within the male finishing die 192 there is mounted an ejecting plunger 220 pressed outward by a spring 221 and held inward by a pin 222 thereon which rides within a cam 223. The cam 223 is held against rotation (Fig. 3) by an arm 224 secured to the main frame. The end of the plunger 220 is the same size as the raised portion of the plunger 202 and is normally held to a position behind the end of the male die 192 to preserve the shape of the bottoms of the containers.

The operation of the rim finishing mechanism may be understood by reference to Figs. 10, 19 and 20.

First (Fig. 10) the female die 195 is moved by the plunger 196 toward the male die having the blank on it. The plunger 202 will grip the bottom of the blank against the plunger 220. Then the cup die 200 will grip the body of the blank against the outside of the male die 192. Then the sleeve 213 will move down over the edge of the rim portion or edge of the blank to confine it so it will be certain to enter the female die.

Next (as shown in Fig. 19) the female die 195 moves up over the male die past the rim shaping shoulder thereon to confine the rim of the blank, the sleeve 213 moving back to permit this telescoping action.

Finally (Fig. 20) the shoulders of the male and female finishing dies are brought together with great force to highly compress the rim and give it its final shape. During this action due to the incipient fold lines previously imparted to the rim and the shape of the finishing dies the rim is substantially doubled upon itself again to form a four-ply rim.

The parts are all returned to their initial positions as shown in Fig. 10.

After the final shaping operation on the rim has been completed the second carrier 193 is rotated in two steps to take the finished container to the discharge position (Fig. 10) over a chute 227. There the plunger 220 is released from the cam 223 and is suddenly forced outward by the spring 221 to eject the container into the chute.

The containers are pushed down the chute and into tight nesting relationship with other containers upon a rack 228 by a swinging arm 229 mounted on a pivot shaft 230. The shaft 230 is operated by an arm 231, a rod 232 and a bell crank lever 233 from the cam shaft 72.

The carrier shaft 97 for the first carrier is intermittently rotated (Fig. 1) by a pawl 234 which engages a ratchet wheel 235 on the shaft. The pawl is mounted upon one arm 236 of a bell crank lever and is actuated by the other arm 237, rod 238 and crank disc 239 mounted on the cam shaft 72. The carrier shaft 97 is held firmly in position except when being rotated by the pawl by any suitable mechanism such as a brake band and is held against reverse rotation by a spring-pressed detent 240 which engages the ratchet wheel 235.

The shaft 194 for the second carrier is intermittently rotated (Fig. 1) by a pawl 245 which engages a ratchet wheel 246 on the shaft. The pawl is mounted on one arm 247 of a bell crank lever and is actuated by the other arm 248, rod 250 and a crank disc 251 mounted on the drive shaft 16. The carrier shaft 194 is held firmly in position except when being rotated by the pawl by any suitable mechanism such as a brake band and is held against reverse rotation by a spring-pressed detent 252 which engages the ratchet wheel 246.

In operation the front edge of a blank at the bottom of the stack is pulled down by the suction tube 20, the finger 21 swinging under the next blank above to retain the rest of the stack. The first feed device 22 grips the front edge of the blank and takes it part way to the plaiting dies then moves back beneath it to grasp another blank. A second feed device 24 also moves back beneath it and engages its rear edge. At the next feeding movement the device 24 moves it forward and the rods 37, tongue 42 and stop pins 48 accurately place it in the female plaiting die beneath the floating ring die 55.

The ring die 55 descends resiliently to start plaits in the outer edge of the blank. Then the male plaiting die 65 descends to form the plaits, partly pulling the outer edges from the ring die. Next the female die is turned to set the creases of the plaits. Then the male die is withdrawn and the plunger 76 operated to force the plaited blank through the bottom of the female die and through the directing member 75 into a female rim-folding die 95 on the first carrier. The plaits are all folded back over each other in this transfer.

The carrier is turned to take the blank to the position shown in Fig. 8 where the rim is folded as already described in connection with Figs. 12—18.

Then the blank is carried by rotation of the first carrier to the bottom thereof and pushed off upon the male die 192 of a second carrier.

After this it is turned to the finishing position as shown in Fig. 10 where the rim is finally compressed and shaped as already described in connection with Figs. 19 and 20.

Finally the finished container is carried over the chute 227 and discharged.

While one embodiment of the invention has been described in detail for purposes of illustration, it is to be understood that the invention may be variously embodied and modified within the scope of the subjoined claims.

I claim:

1. Apparatus for forming plaited paper containers with an integral rim, comprising in combination, means for supporting a stack of flat blanks, blank plaiting mechanism, means for feeding blanks one at a time from the stack to said plaiting mechanism, a female plaiting die included in said plaiting mechanism supported in a fixed position, said female die being open at the bottom, a male plaiting die movable axially relative to the female die for plaiting a blank, a plunger for pushing the plaited blank through the female die, a carrier mounted to turn about a horizontal axis beneath the female die, a plurality of cup-shaped dies mounted on the carrier, a male plunger die mounted at a station at which the cup-shaped dies are halted, the male plunger die closely fitting within a cup-shaped die and adapted to hold a container firmly therein, means associated with the cup-shaped die and the male plunger die for forming a rim on the container, a second carrier mounted to rotate about a horizontal axis beneath the first carrier, a plurality of plug dies on said second carrier adapted to be placed in succession beneath the cup-shaped dies of the first carrier as they are halted in inverted position, means for ejecting a container from a cup-shaped die to cause it to fall on a plug die, a female plunger die mounted at a station at which said plug dies are halted for finally shaping the container, and means for ejecting completed containers from said plug dies.

2. Apparatus for forming plaited paper containers with an integral rim, comprising in combination, means for presenting blanks to container forming mechanism, dies for plaiting blanks, a first carrier, a cup-shaped die on said carrier movable from a first position beneath the plaiting dies where it receives a container to a second position where the plaits are set and a rim formed on the container and to a third position where the container is discharged, means for transferring containers from the plaiting dies to the cup-shaped die, means for setting the plaits and forming a rim on the containers at the second position, a second carrier, a plug die thereon movable from a first position where it receives a container to a second position where the container is finally shaped and to a third position where the container is discharged, means for transferring containers from the cup-shaped die to the plug die, means for finally shaping the containers at the second position, and means for ejecting the containers from the plug die at the third position.

3. Apparatus for forming a plaited paper container, comprising in combination, means for forming plaits in a sheet paper blank, a rotatable carrier mounted adjacent the plait forming means, a plurality of cup-shaped dies on said carrier, means for transferring a plaited blank from said plaiting means to a die on said carrier, means to rotate said carrier, a male plunger die operatively located at a fixed position to which said plaited blank is carried by the cup-shaped die for firmly holding the blank in the cup-shaped die, and means co-operating with said cup-shaped die and said male plunger die for forming a rim on the container.

4. Apparatus for forming containers of paper or the like, comprising a rotatable carrier, a plurality of radially disposed cup-shaped dies on said carrier, means to deposit plaited container blank in said dies, means cooperating with said dies for forming rims on the containers at a position to which said dies are turned after the plaited blank has been deposited therein, means for transferring a partly completed blank when the dies have been turned to another position, and means for receiving the partly completed blank and thereafter subjecting it to a final rim-shaping operation.

5. Apparatus for forming a plaited paper container, comprising in combination, a rotatable carrier, a die on the carrier for a container, a cooperating die at a fixed position to which said rotatable die is carried, cooperating sleeves on said rotatable and fixed dies, and means for cooperatively operating said sleeves and dies to grip the body of the container and form a rim on the edge thereof when it is halted at said fixed position.

6. Apparatus for forming paper containers comprising in combination, a plurality of carrier wheels rotatable about horizontal axes, the one below the other, a plurality of radially mounted container holders on each carrier wheel, a holder on one wheel being vertically registerable with a holder of the other wheel in a given position of the wheels, and means for ejecting a container from the holder of the upper wheel when the holders are in registering position whereby the container may fall by gravity into position on the lower holder.

7. Apparatus for forming paper containers, comprising in combination, an upper carrier wheel mounted upon a horizontal axis, a plurality of cup-shaped container holders radially mounted thereon, a lower carrier wheel mounted upon a horizontal axis, a plurality of plug shaped container holders radially mounted thereon, said wheels being mounted in such a relation that holders of the upper and lower wheels may be brought into vertical registry, means assisted by gravity for transferring containers between said holders when in registering position, and means cooperating with each wheel at other positions for shaping containers on the holders thereon.

8. In apparatus for forming containers from paper, in combination, a rack for a stack of container blanks, a suction device for pulling down the front edge of the lowermost blank, a pull feed device for grasping the blank and pulling it a first step, a pushing feed device for moving the blank a second step, dies for shaping the blank, and a third feed device for adjusting the blank in position in the dies.

9. Apparatus as set forth in claim 8 in which both said first and said second feed devices are mounted upon a single reciprocable slide.

10. Apparatus as set forth in claim 8 in which both said first and said second feed devices are mounted to move in unison, the first feed device including a swingable gripper jaw and the second feed device including a swingable pusher finger, both said jaw and said finger swinging down clear below the blanks on their return or non-feeding movement.

11. Apparatus for forming one-piece plaited containers, comprising in combination, plaiting dies located at a fixed position, means for feeding blanks to said dies, a through opening in the lowermost of said plaiting dies, a carrier wheel mounted upon a horizontal shaft below said plaiting dies, a plurality of radial dies on said wheel, means for transferring a plaited blank through said plaiting die and upon a rotatable die, and means at a position along the path of said rotatable die and cooperating therewith for shaping a rim on the container carried thereby.

12. Apparatus for forming plaited paper containers, comprising in combination, a carrier, a plurality of cup-shaped container holders on said carrier, means for placing a pre-plaited container blank in a holder, means for moving said carrier in steps, means at a second position about the path of the carrier for preliminarily forming a rim on the container, a second carrier, a plurality of plug-shaped container holders on said carrier, means for moving the second carrier, means for transferring a container from the cup-shaped holder of the first carrier to a plug shaped holder of the second carrier when the holders are disposed in registry, and means for completing the formation of the rim on the container at a second position to which it is carried by the second carrier.

13. Apparatus as set forth in claim 12 in which said carriers are rotatable and turn about parallel axes.

14. Apparatus as set forth in claim 12 in which said carriers are rotatable about parallel horizontal axes, one below the other.

15. In apparatus for forming containers from sheet material like paper, in combination, upper and lower plaiting dies, the upper die being movable and the lower die being fixed vertically, means synchronized with said upper die for feeding a blank into approximate position when said upper die is raised, fixed stops on the front side of said die for accurately defining the position of the blank, and movable means acting subsequently to said feeding means but while said upper die is still raised for engaging the blank with said stops for accurately positioning it for the dies when operated.

16. Apparatus for manufacturing plaited paper containers, comprising in combination a conical female plaiting die provided with a plurality of plaiting ribs disposed in alignment with elements of the cone, a mating conical male plaiting die provided with corresponding fixed plaiting ribs disposed in alignment with elements of the cone, the ribs of the female die extending upwardly beyond the ends of the ribs of the male die, an annular crimping die surrounding said male die and adapted to cooperate with the outer portion of the female die, said crimping die being provided with members adapted to enter between the ribs of the female die, and coordinated means for operating the male die and the crimping die to permit the introduction of container blanks into the dies and to plait the blank.

17. Apparatus as set forth in claim 16 which further includes resilient means for urging said annular crimping die against said female die.

18. Apparatus as set forth in claim 16 which further includes means for rotating one of said plaiting dies after they have come together to set the creases of the plaits of the container blanks.

19. Apparatus as set forth in claim 16 which further includes a plunger within the male die, said female die being formed with a bottom opening, and means for actuating said plunger to force plaited blanks through the bottom of the female die.

20. Apparatus as set forth in claim 16 which further includes a cylindrical plunger provided with longitudinal ribs arranged parallel with cylindrical elements, said plunger being mounted within the male die, said female die being formed with a bottom opening into which the ribs of the die extend for cooperation with the ribs of the plunger, and means for actuating said plunger to force plaited blanks through the bottom of the female die.

21. Apparatus for forming rims on containers, comprising in combination, a male rim shaping die, a mating female rim shaping die, said male die being provided with an integral conical portion fitting within the body of the container, a conical clamping die slidably mounted in the female die, means for moving said clamping die out of the female die so as to grip the container on the conical portion of the male die before the male and female dies begin forming the rim, and means for telescoping said dies.

22. Apparatus as set forth in claim 21 which further comprises in combination, a sleeve mounted on said male die, and means for actuating said sleeve after the container has been clamped to said male die but before the rim shaping portions of the dies have converged for pushing the outer edge of the rim into the space between the rim shaping portions of the dies.

23. Apparatus for manufacturing paper containers, comprising in combination, a first carrier mounted to rotate about a fixed axis, a radially disposed container holder thereon, a second carrier mounted to rotate about a fixed axis, a radially disposed container holder thereon, and means mounted on said carriers for transferring containers from the holders of one to the holders of the other.

24. Apparatus for manufacturing containers, comprising in combination, a rotatable carrier, a female die thereon, means for placing a container in said female die at one position, a male die operatively located at a fixed position, means for moving said carrier to place said female die in operative position with respect to the male die, a plurality of sleeve dies in opposed relationship on the male and female dies for forming rims on the containers, and means for cooperatively actuating all of said dies for clamping the container and forming a rim thereon while the female die is halted at the male die.

25. Apparatus as set forth in claim 24 which further includes iris diaphragm dies associated with the sleeve dies, and means for operating the iris dies in coordination with the action of the sleeve dies.

EUGENE CONTI.